United States Patent [19]

Jackson et al.

[11] Patent Number: 4,658,524

[45] Date of Patent: Apr. 21, 1987

[54] STORAGE AND SELECTABLE DISPLAY DEVICE FOR SHEET MEDIA

[75] Inventors: Garth A. Jackson; A. Stevens Ballard, both of King County, Wash.

[73] Assignee: Top Flite Industries, Inc., Seattle, Wash.

[21] Appl. No.: 692,779

[22] Filed: Jan. 18, 1985

[51] Int. Cl.⁴ .............................................. G09F 11/02
[52] U.S. Cl. ........................................ 40/499; 40/379; 40/493
[58] Field of Search ................. 40/379, 378, 530, 499, 40/493

[56] References Cited

U.S. PATENT DOCUMENTS

| | | |
|---|---|---|
| 66,463 | 7/1867 | Coloney et al. |
| 167,416 | 9/1875 | Stephenson . |
| 446,021 | 2/1891 | Semple . |
| 807,605 | 12/1905 | Dann . |
| 2,294,276 | 8/1942 | Callinicos . |
| 2,552,448 | 5/1951 | Ortendahl ............................ 40/379 |
| 4,034,929 | 7/1977 | Ebner, Jr. . |
| 4,212,389 | 7/1980 | Robbins . |
| 4,257,179 | 3/1981 | Oka et al. ............................ 40/378 |
| 4,520,583 | 6/1985 | Oka ...................................... 40/378 |

FOREIGN PATENT DOCUMENTS 63587  6/1945  Denmark ............................ 40/499

*Primary Examiner*—Gene Mancene
*Assistant Examiner*—Wenceslao J. Contreras
*Attorney, Agent, or Firm*—Seed and Berry

[57] ABSTRACT

A storage and selectable display device for sheet media includes an enclosure having a slot. A rotatable spool is secured within the enclosure. A leader assembly attaches the sheets to the spool so that the free edges of the sheets are circumferentially disposed about the spool when rolled up. Individual leaders are attached to a master leader and charts are attached to the individual leaders. An actuator connected through a clutch rotates the spool to wind the sheets. Opposite rotation is prevented by the clutch. Belts frictionally engage a portion of the outermost surface of the spool and rolled sheets. Shafts are provided to hold the belts in position. The belt drive shaft is connected to the actuator by gearing and a clutch. The clutch actuates in the unwind direction, but not in the opposite direction. A flexible, resilient, transparent window has one edge which resiliently engages the rolled charts.

An alternative ejection system includes a lay shaft and frictionally engaged idler roller. The lay shaft is rotated by connection to the actuator and through a clutch which prevents rotation in the wind direction and causes rotation in the opposite direction.

Another embodiment of the enclosure has a planar upper surface forming a plotting surface; a slot along one side of such surface; a translating plotting arm; a cursor support on the plotting arm and a cursor pivotally connected to the support for rotation about an axis normal to the plotting surface.

10 Claims, 11 Drawing Figures

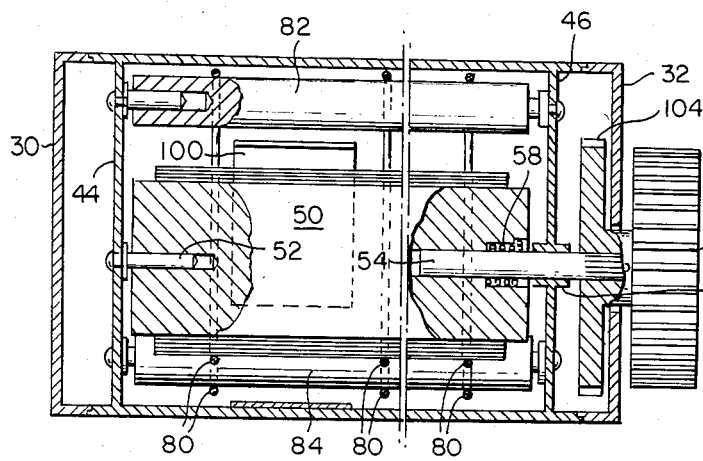
FIG. 4
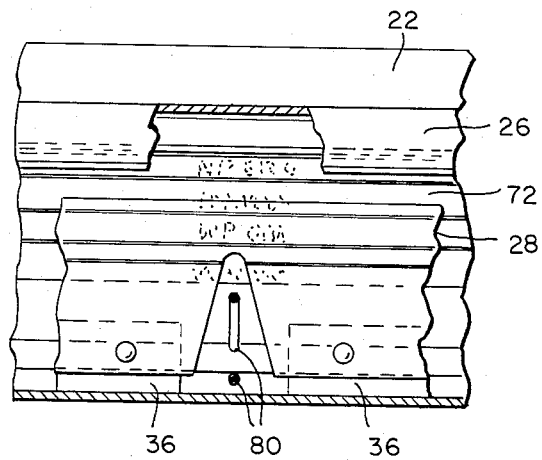
FIG. 5
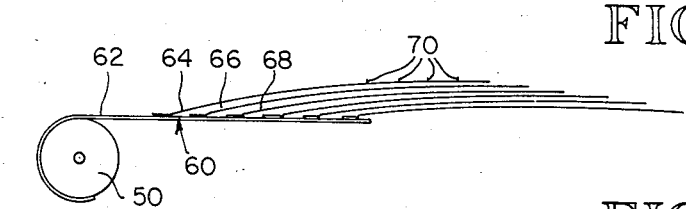
FIG. 6
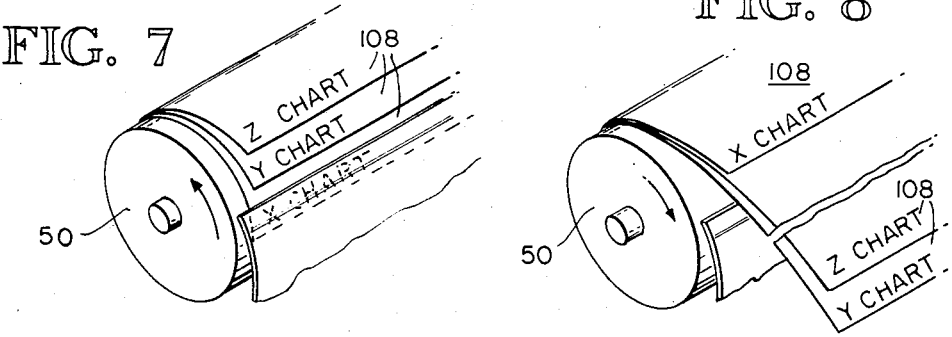
FIG. 7
FIG. 8

STORAGE AND SELECTABLE DISPLAY DEVICE FOR SHEET MEDIA

TECHNICAL FIELD

The invention relates to storage and display devices for sheet media, such as nautical charts, maps, graphic presentations, and navigation plotting tables and plotting equipment.

BACKGROUND OF THE INVENTION

Protective holders for storage and display of maps have been previously developed. See U.S. Pat. No. 446,021, Semple. This type of holder consists basically of a spool held within a cylindrical container. The container has a slot through which the map projects and may be extended or retracted for display or storage respectively.

In the past several of these containers have been linked together vertically in order to create a display for several maps. Please see U.S. Pat. No. 807,605, Dann.

Several maps or charts are quite often needed by a navigator in the course of a voyage by ship or boat. Additionally there may be severe space limitations, particularly on smaller vssels and therefore, having separate holders for each chart can become impractical. However, there is still a need to protect the charts from damage yet have convenient access to any chart. It is also useful to have the charts stored as close as possible to the plotting surfaces such as the chart table and the plotting equipment. On smaller vessels a chart table may not be provided and therefore, some form of planar surface will need to be provided for use as a plotting surface.

An object of the invention is to provide a protective, compact, storage device for several charts or other sheet media.

A further object of the invention is to provide a multiple chart storage device from which any one of the stored charts may be accessed for use.

A further object of the invention is to provide a chart storage and display device which also includes an integral plotting surface and ploting aids.

DISCLOSURE OF THE INVENTION

A storage and selectable display device, or chart holder, for sheet media such as nautical charts is provided. The preferred embodiment has an enclosure which protects the charts from damage while they are being stored. One form of the enclosure has a base; a rear wall; a forwardly positioned, top wall section; rearwardly positioned front wall section; a lower, front wall section and an upper, front wall section. A slot is formed between the front wall sections through which the charts may be extended or retracted. A rotatable spool, for holding the charts, is secured within the enclosure. A leader assembly is usef for attaching an edge of each chart to the spool so that the free edges of the sheets are circumferentially disposed at spaced positions about the spool when the charts are fully rolled about the spool. The leader assembly includes a master leader of a flexible sheet material which is removably secured to the spool and wraps about the spool. Individual leaders are formed of sheets of flexible material each having one edge attached to the master leader so that the individual leaders are spaced circumferentially about the spool. The individual charts are attached to the individual leaders. An actuator is connected through a clutch to rotate the spool. The actuator may be rotated in one direction to wind the sheets about the spool. Driven rotation of the spool in the opposite direction is prevented by the clutch. A provision for unrolling the sheet from the spool takes the form of a series of belts disposed longitudinally along the spool. A portion of each belt frictionally engages a portion of the outermost surface of the assembly formed by the spool and portions of the sheets rolled thereabout. Cylindrical shafts are provided to hold the belts in position with one shaft serving as a belt drive. The belt drive shaft is connected to the actuator by gearing and an interposed clutch. The clutch permits the actuation of the belts when the actuator is rotated in the unwind direction, but prevents similar driven actuation when the actuator is rotated in the opposite chart wind direction. A window of a flexible, resilient, transparent material, and visible through the slot, is positioned in the interior of the enclosure. It has one edge which resiliently engages the outer surface of the assembly formed by the spool and charts wound thereabout. When the spool is rotated in the wind direction the charts pass beneath the window. When the spool is rotated in the opposite direction the window causes the charts to be guided out of the slot for ejection. Fingers positioned within the enclosure also serve to guide the sheets when the spool is rotated in the unwind direction.

Indicia may be provided on the ends of the charts which are visible through the window and serve to aid in the alignment of the charts to be ejected. When it is desired to view a particular chart, the chart whose indicia is visible beneath the window when the spool is first rotated in the unwind direction will be the chart that will be ejected last and therefore, on top of the other charts.

An alternative ejection drive system includes a lay shaft positioned parallel to the spool and an idler roller which is frictionally engaged with the idler roller and the outer surface of the assembly formed by the spool and portions of the chart rolled thereabout. The lay shaft is rotated by connection to the actuator and through a clutch which prevents rotation of the lay shaft when the actuator is rotated in the wind direction and causes rotation of the lay shaft through the clutch when the actuator is rotated in the opposite direction. The clutch described above between the actuator and the spool may be eliminated in which case the peripheral velocity of the idler roller should slightly exceed that of the spool and chart assembly when a full complement of charts are rolled thereabout.

Another embodiment of the enclosure has a planar upper surface forming a plotting surface. A slot through which the charts are extended or retracted extends along one side of such surface. A plotting arm is connected to the enclosure in a manner that permits translational movement of the plotting arm over the plotting surface. A cursor support is pivotally connected to the end of the plotting arm and a cursor is pivotally connected to the support for rotation about an axis which is normal to the plotting surface when the cursor is adjacent to the plotting surface.

DESCRIPTION OF THE DRAWINGS

FIG. 4 is a shortened, longitudinal section view of the preferred embodiment taken along the line 4—4 from FIG. 2.

FIG. 5 is a partial, section view of the preferred embodiment taken along the line 5—5 from FIG. 2.

FIG. 6 is a side elevation view of the spool and leader assembly with the leader elements having an exaggerated length for purposes of clarity.

FIG. 7 is a partial perspective view of the preferred embodiment illustrating the spool, attached charts and the windows when the charts are being wound onto the spool.

FIG. 8 is a partial perspective view of the spool, charts and window of FIG. 7 illustrating the operation of the invention when the charts are being unrolled from the spool.

BEST MODE FOR CARRYING OUT THE INVENTION

The invention relates to a storage and selectable display device for sheet media. The use of the invention will be described in terms of use in connection with nautical charts. Such use is only illustrative and use in connection with other sheet media may be made.

In the case of nautical charts it is often necessary for the navigator to use several charts in the course of a voyage. The invention provides a convenient storage for several charts. The examples below will be described in terms of use with six charts. Use with more or fewer charts may be made. The invention protects the charts from damage by water, soiling and from physical damage. Through the use of the invention the charts may be made available for viewing and use with selectable access so that a particular chart may be positioned on the top of a stack of charts with the remaining charts readily accessible by lifting the others on top.

The preferred embodiment of the invention is shown in FIGS. 1 through 8.

Figure 11:
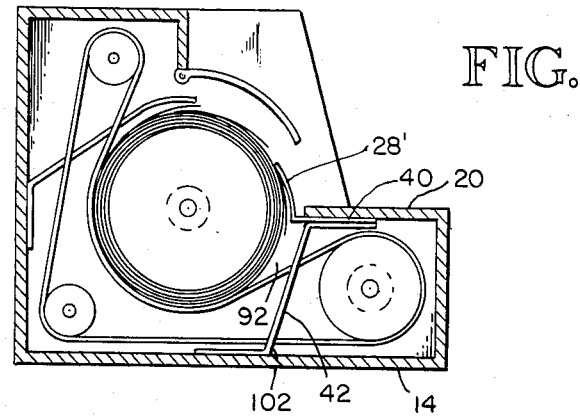
FIG. 11 is a transverse section view illustrating an alternative embodiment of the window structuure and sheet guides.

The storage and selectable display device 10, or chart holder, has an outer enclosure 12 formed by walls including base panel 14, rear panel 16, top panel sections 18 and 20, front panel sections 22 and 24, access panel 26, window 28, and end panels 30 and 32. The access panel provides access to the interior of the enclosure such as through the use of hinge 34. The window is preferably of a flexible, resilient, transparent material such a Mylar branc plastic film. The window is secured to the rest of the enclosure structure such as by the use of support member 36 which is secured to the inside of the base of the enclosure to which the lower edge of the window is secured such as by means of fasteners 38. An alternative window attachment method is llustrated in FIG. 11. In this case, the window 28' is provided with a horizontal extension which is secured to the underside of top panel section 20 such as by the use of finger 102 a function of which is described below. The enclosure is also provided with interior end walls 44 and 46 which are used to support some of the mechanisms described below which are mounted in the interior of the enclosure. Access to these interior panels are provided by making the end panels 30 and 32 removable.

A spool 50 is secured inside the enclosure for rotating movement and forms the basic structure about which the charts are rolled for storage. The spool may be mounted for rotating by securing one end to the enclosure, such as by mounting it on stub shaft 52 which is removably secured to interior wall 44 and securing the opposite end by mounting it on stub shaft 54 which in turn is supported for rotating movement by the journal box or sleeve 56 formed in interior wall 46. This latter shaft stub 54 extends through end panel 32. By removing the enclosure end panels 30 and 32 and withdrawing stub shafts 52 and 54, the spool, with any attached charts, may be withdrawn from the enclosure by opening the hinged access panel. The window 28, being made of a resilient, flexible material, bends to permit the removal and insertion of the spool. A clutch, such as spring clutch 58, connects the spool to stub shaft 54 so that rotation of the stub shaft causes rotation of the spool in one direction, the direction for winding the charts on the spool but will not cause rotation of the spool when the shaft is rotated in the opposite direction.

The charts are secured to the spools by an attachment structure such as leader assembly 60. In its preferred form the leader assembly has two principal components. The master leader 62 and individual leaders of which individual leaders 64, 66 and 68 are representative. The master leader consists of a sheet of flexible material, such as Mylar brand plastic, vinyl, polyethelene or the like which may be secured, such as through the use of adhesives or clamps, around the outer surface of the spool. For example, since nautical charts are commonly 36 inches wide by 48 inches in length a spool size may be selected such that it has a circumference which is 8 inches. In such a case the master leader will be formed of a piece of rectangularly shaped material at least 36 inches in width and 8 inches in length so that it may wrap fully about the surface of the spool. One edge of each chart will have an edge which is attached to the spool by the use of an individual leader. Normally the charts would be attached to the leader assembly along the top edge of the chart. Each chart is attached to a separate, individual leader. Charts which are not of the standard 36 by 48 inch size are normally smaller. The chart holder 10 will readily accommodate charts which are narrower in width without any structural changes. However, to accommodate charts of a different height the length of individual leaders, or the point of attachment of individual leaders to the top of the chart is varied. The individual leaders provide the same effective length for all the charts. In order for the charts to be ejected from the device in the manner described below the charts are attached to the spool by the use of the leaders so that the free edges, in this case the bottom of the individual charts, are circumferentially disposed in spaced positions around the spool when the charts are wrapped fully around the spool. In order to assist in achieving this result markings, such as indicia 70 on individual leader 64 are provided. The chart that is to be secured to the individual leader 64 is aligned so that its top edge aligns with one of the markings. The markings indicate the length of the chart that should be attached along that marking so that the combined length of the individual leader extending above the top of the chart and the length of the chart are equal for all charts mounted on the spool. The charts may be secured to the individual leaders by any convenient method, such as by the use of double sided adhesive tape. The individual leaders are formed of a flexible sheet material, like the master leader, and are radially spaced about the spool when the master leader is mounted on the spool. One edge of the leader is connected to the master leader and the other edge forms a free edge along which the charts may be secured. The length of the individual leaders is selected so that it is greater than the circumference of the spool plus the difference between the longest and shortest charts to be displayed. The leader length must be long enough so that all of the last chart to be ejected for viewing is visible.

Figure 1:
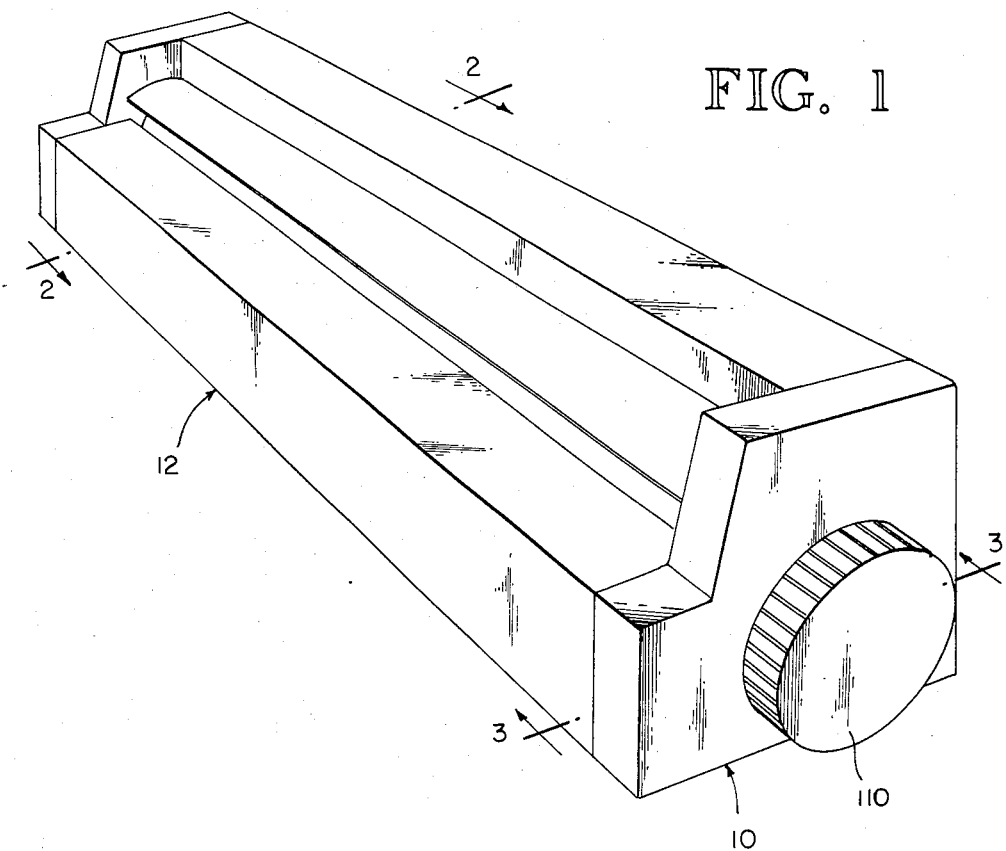
FIG. 1 is a perspective view of the Storage and Selective Display Device for Sheet Media in its preferred form.
Figure 2:
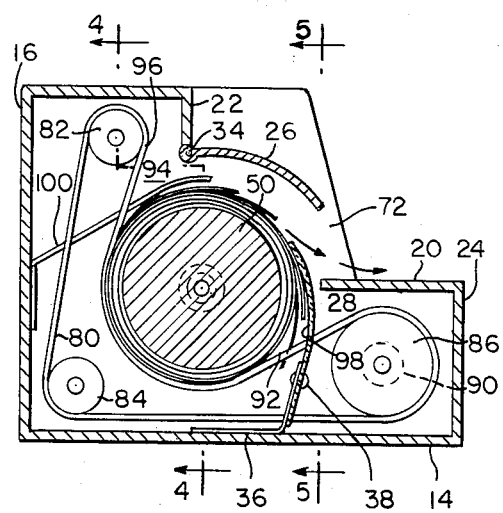
FIG. 2 is a transverse section view taken along the line 2—2 from FIG. 1.

The leader assembly 60 is secured to the spool and the charts fastened to the leaders in a manner so that the charts are wound around the spool when the spool is wound in a counterclockwise direction when viewed as shown in FIG. 2. The free ends of the charts are extendable through slot 72 which extends across the width of the chart holder 10. The slot is formed between the lower edge of the access panel 26 and the top of the top panel section 20.

In order to view the charts they are unwound from the spool and ejected through the slot 72. While rotating the spool in the direction necessary to unwind the charts would accomplish the desired result of ejecting the charts this does not work effectively, particularly when the charts are on light paper stock or are damp. This is because they are essentially being pushed rather than being pulled as they are and they are being wound on the spool. In order to unwind the charts from the spool and avoid this disadvantage the spool with the charts wound thereabout is rotated in a clockwise direction, as seen when viewed in FIG. 2 by frictionally driving in a clockwise direction the outer surface of the spool assembly and those portions of the charts which are wound around the spool.

Figure 3:
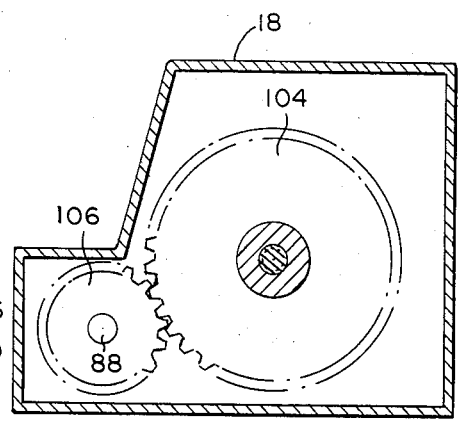
FIG. 3 is a transverse section view taken along the line 3—3 from FIG. 1.

The preferred form of the unrolling mechanism is illustrated in FIGS. 2, 3 and 4. A series of belts 80 are longitudinally positioned along the length of the spool. A portion of the length of each belt engages a substantial segment of the circumference of the spool assembly with those portions of the charts which are wrapped about the spool. Preferably at least one third of the outer surface is contacted. The belts are preferably mounted on rollers or the like, such as return roller 82, idler roller 84 and drive roller 86. The return roller and idler roller are mounted on retractable stub shafts, like stub shaft 52 supporting the one end of the spool. The drive shaft has a similar stub shaft supporting one end and a stub shaft 88 similar to stub shaft 54 on the spool and extending through interior wall 46 on the opposite end. The belting is preferably of a resilient material such as rubber or the like. The size of the belts and the positioning of the supporting rollers are selected so that the belts are biased against the spool assembly when there are no charts on it as well as when a full complement of charts are fully rolled about the spool.

The drive shaft freely rotates on stub shaft 88. A clutch, such as spring clutch 90, causes rotation of the drive shaft in the counterclockwise direction when viewed as in FIG. 2 when the stub shaft 88 is rotated in the same direction. The clutch prevents rotation of the drive roller when the stub shaft is rotated in the opposite direction.

Guides are provided to direct the free edges of the charts into the nip 92 formed by the belts and the clockwise rotating spool; across the gap 94 between the upper belt run 96 and the under surface of access panel 26; as well as, across the gap between the spool assembly and the bottom edge of slot 72 when the charts are to be ejected. The guides may be formed partly or wholly by the surface formation of the interior structure of the enclosure. In the preferred embodiment the guide structure is formed, in part, by the interior surface of the window 98. In the preferred form the window has an arcuate shape and the upper edge of the window is biased so that it engages the outer surface of the spool and chart assembly. the upper edge of the window directs the free edges of the charts out of the slot when the charts are to be ejected but permit their passage underneath the window when the chars are wound in the opposite direction. See FIGS. 7 and 8. Formed metal fingers, such as fingers 100 attached to the interior of the rear panel 16 and project between the belts to guide the ends of the charts across gap 94. Where the window is utilized in the alternative form 28' shown in FIG. 11, fingers 102 connected to the interior surface of base 14 and the under surface of top panel section 20 guide the ends of the chart into nip 92.

The chart holder may be manually driven or automatically driven. In the manually driven version illustrated in the drawings a hand wheel 110 is mounted on the end of stub shaft 54. Rotation of the hand wheel in one direction causes the spool to wind the charts onto the spool. Rotation in the opposite direction does not directly cause rotation of the spool. In order to operate the drive shaft in order to unroll the charts from the spool, stub shaft 88 on which the belt drive shaft 86 is mounted is connected to the hand wheel. The preferred form of connection includes gear 104 mounted on the stub shaft 54 and gear 106 mounted on the stub shaft 88. Gear 104 meshes with gear 106 so that when the hand wheel is rotated in the direction opposite that necessary to wind the charts on the spool the belts are driven to unwind the charts from the spool.

When the charts are fully wound on the spool the tails of the individual charts are spaced about the spool. The visible surface of the chart may be provided with an indicia, such as markings 108, which indicate the subject matter contained in the chart. These indicia are visible by looking through that portion of the window 28 visible through slot 72. A line may be provided on the window for positioning the charts with respect to the window and which is visible through slot 72. The top edge of the window is positioned relative to the slot 72 so that when the spool is rotated in the wind direction the indicia on the sheet which will be ejected last when the direction of the spool rotation is reversed will be visible through the window and aligned with the line on the window. When the charts are ejected by actuation of the drive shaft 86 and belts, the chart which has its end positioned closest to the top edge of the window 28 in a counterclockwise direction from the top of the window is ejected first. The top edge of the window guides the chart's free end out through the slot when the belts are actuated. See FIGS. 7 and 8. The free ends of the other sheets are sequentially ejected upon continued actuation of the belts until the last sheet, whose indicia was visible through the window, is ejected last and on top of the other sheets. During ejection the spool rotates in a clockwise direction, when viewed as in FIG. 2 being pulled by the charts being unwound under the influence of the belt drive. The hand wheel is rotated until all of the charts have been ejected and the top chart is fully visible.

Figure 10:
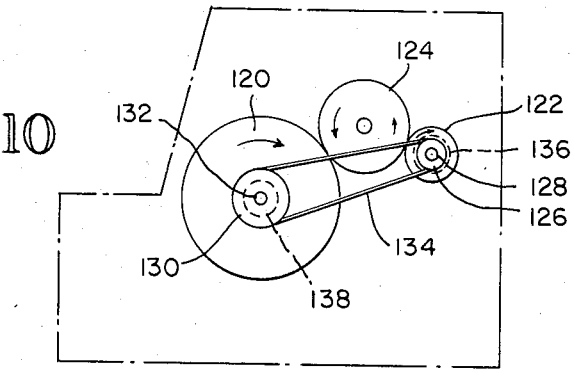
FIG. 10 is a transverse section view, in schematic form, of an alternative embodiment of part of the sheet unrolling mechanism.

FIG. 10 illustrates an alternative mechanism for use in ejecting the charts from the chart holder. The spool 120 is structured as previously described above in connection with the preferred embodiment. It is driven and operates as previously described in connection with preferred embodiment except that clutch 138 may be or may not be eliminated as described below.

In order to eject the charts though, instead of the belt and belt drive assembly, the chart holder is provided with a lay shaft 122 which is rotatable and extends parallel to the spool 120. An idler roller 124, in the form of a cylindrical roller, is positioned parallel to the lay shaft. The idler roller is in frictional engagement with the lay shaft and the outermost surface of the assembly formed by the spool and portions of the charts wound thereabout. The lay shaft is connected to a hand wheel or other actuator. The connection may be such as through the use of pulley 126 which is mounted on shaft 128 which supports the lay shaft, pulley 130 which is mounted on the stub shaft 132 for rotation therewith and actuation by the hand wheel or other actuator, and interconnecting belt 134. The pulley ratio is selected so that the peripheral velocity of the idler roller is somewhat greater than that of the outer surface of the fully loaded spool. A clutch 136 is mounted on the lay shaft support shaft 128 or elsewhere in the lay shaft drive so that the lay shaft is not driven via the clutch 136 when the pulley 130 is rotated in the wind direction but the lay shaft is driven when the spool is rotated in the unwind direction. When the clutch 138 is used the pulley ratio is not important since the lay shaft and spool would not be driven in the same direction when unwinding or winding the charts on the spool. Rotating the stub shaft 132 in the wind direction, clockwise when viewed as in FIG. 10 causes the spool to roll up the charts while the lay shaft and roller freewheel. Rotation of the hand wheel in the direction opposite to the spool wind direction would unwind the charts by the frictional action of the idler roller against the outer surface of the charts and spool assembly.

Figure 9:
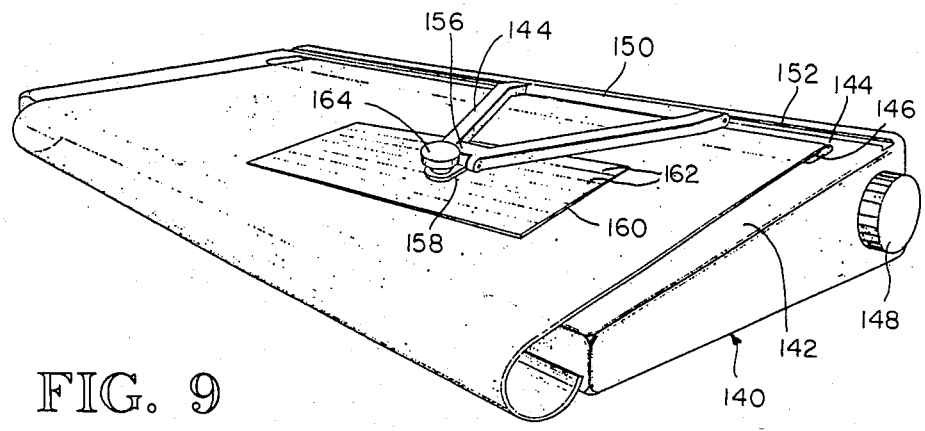
FIG. 9 is a perspective of an alternative embodiment of the invention where the enclosure forms and includes a plotting surface and also includes a plotting arm and cursor.

FIG. 9 illustrates a modification to the chart holder enclosure which incorporates an integral chart table and XY plotter. In this embodiment the enclosure 140 has an extended top panel 142 which forms a plotting surface. The chart ejection slot 144 is positioned towards the upper edge of the plotting surface 142. Chart viewing window 146 is visible through the slot and functions as described in the previously described embodiment. Hand wheel 148 is provided on the end of the enclosure and operates as previously described in connection with the preferred embodiment. The remaining internal mechanisms of the chart storage and display mechanism operate as previously described with their positions modified to adapt to the window and the slot position on the top of the enclosure. These mechanisms operate to eject the charts so they extend over the plotting surface with the desired chart on top. A transverse sliding attachment is provided, such as slider 150 which is captively secured in groove 152 for translational movement along the top edge of the plotting surface. Plotter arm 154 is pivotally connected, such as by a hinged connection, to the slider which permits its outer end to be raised above the plotting surface. A cursor mount is secured by the hinged connection which is parallel to the other hinged connection on the plotter arm to the outer end of the plotter arm. A cursor is pivotally mounted on the cursor mount for rotational movement about an axis normal to the plotting surface. The cursor preferably takes the form of a rectangular, transparent sheet of rigid material having parallel lines 162 extending across it. The cursor may be secured by any angle of rotation, such as by the use of securement knob 164. Directons from a compass rose on a chart may be transferred to any other position on a chart be securing the cursor at the appropriate azimuth by use of the knob 164 and sliding the cursor to the left or right to move across the chart and ejecting or rewinding the chart in order to position the cursor higher or lower on the chart.

While this invention has been described in conjunction with specific embodiments of the storage and selectable display device as used with nautical charts, it should be understood that these are merely illustrative. Numerous modifications and alterations may be made to the device and its use without departing from the spirit and scope of the invention, and it is intended that the patent shall cover whatever features of patentable novelty exist in the invention and are encompassed within the following claims.

We claim:

1. A storage and selectable display device for a plurality of printed sheets, each sheet having an attachment edge and an oppositely disposed free edge and indicia on the printed side of the sheet and adjacent to the free edge, comprising:
   (a) an enclosure having walls defining a slot through which the sheets may be extended and retracted;
   (b) a spool rotatably secured within the enclosure and about which the sheets may be rolled;
   (c) means for attaching the attachment edge of each sheet to the spool so that the free edges of the sheets are circumferentially disposed at spaced positions about the spool when the sheets are fully rolled about the spool to expose the indicia on the free edges of the sheets;
   (d) means for rotating the spool to wind the sheets about the spool;
   (e) means for sequentially viewing the free edges of the sheets as the spool is rotated in the winding direction;
   (f) means for frictionally driving the outermost surface of the assembly formed by the spool and the exposed portions of the sheets to unwind the sheets;
   (g) means for alternately driving the spool rotating means and the outermost frictional driving means so that on winding, the spool is driven while the frictional drive means is undriven and so that on unwinding the frictional drive means is driven while the spool is undriven to prevent bunching of the sheets; and
   (h) means for sequentially guiding the free edges of the sheets out of the slot when the sheets are unwound from the spool so that the last sheet viewed is ejected on the top of the other sheets with the indicia and printed side up.

2. The device of claim 1, wherein the frictional drive means includes:
   (a) a plurality of belts disposed longitudinally along the spool with each belt having a portion thereof frictionally engaging a portion of the outermost surface of the assembly formed by the spool and those portions of the sheets wound thereabout;

(b) means for holding the belts in engagement with such outer surface; and (c) means for rotating the belts on such belt holding means to unwind the sheets from the spool.

3. The device of claim 2, wherein the belt holding means includes a rotatable shaft upon which the belts are mounted so that rotation of the shaft causes the belts to rotate.

4. The device of claim 3 wherein the alternate drive means includes a first clutch connected to the spool to cause rotation of the spool in the wind direction and freewheeling of the spool in the unwind direction and a second clutch connected to the belt rotation shaft which causes rotation of the belts in the unwind direction and freewheeling of the belts in the wind direction.

5. The device of claim 1, wherein the frictional drive means includes:

(a) a rotatable, lay shaft positioned parallel to the spool enclosure and in a spaced relation thereto;

(b) a rotatable, idler roller, positioned parallel to the spool and lay shaft and in frictional engagement with the lay shaft and the outermost surface of the assembly formed by the spool and portions of the sheets thereabout; and (c) means for rotating the lay shaft to cause rotation of the idler roll to in turn unroll the sheets from the spool.

6. The device of claim 1, wherein the sheet attachment means comprises flexible master leader having a leading edge securable to the surface of the spool and a free trailing edge and a plurality of connectors sequentially disposed across the master leader each for connecting the attachment edges of a media sheet to the master leader at the circumferentially spaced positions about the spool.

7. The device of claim 6, wherein the sheet connectors comprise a plurality of flexible individual leaders each connected along one edge of the master leader and having an opposite edge between which the attachment edge of sheets of various lengths may be connected.

8. The device of claim 1, wherein the viewing means further includes a window, positioned adjacent to the slot in the enclosure and on the side of the slot through which the free edges of the sheets first pass when the spool is wound in the sheet wind direction, through which any indicia placed on the free ends of the sheets may be read and wherein the means for guiding the sheets out of the slot includes a leading edge portion of the window, biased towards the spool to engage the sheets so that a sheet having its indicia visible through the window will be the last sheet ejected if the sheets are unwound from the position in which the indicia on such sheet was visible through the window.

9. The device of claim 7, wherein the length of the individual leaders are greater than the circumference of the spool plus the difference between the longest and shortest sheet media to be displayed.

10. A storage and selectable display device for sheet media, each sheet having an attachment edge and an oppositely disposed free edge, as claimed in claim 1, for use in connection with nautical charts and the like wherein the enclosure has a planar upper surface upon which the sheet may rest for viewing, wherein the slot through which the sheets may be extended or retracted extends along one side of said planar surface and further including a plotting arm support; means for connecting the plotting arm support to the enclosure for translational movement along one side of the plotting surface; a plotting arm pivotally connected to the plotting arm support having a cursor support end opposite its connection to the plotting arm support with the pivotal connection permitting the raising and lowering of the cursor support end over the plotting surface; a cursor support pivotally connected to the cursor support end of the plotting arm, said pivotal connection having an axis parallel to the plotting arm to plotting arm support pivot axis; and a cursor pivotally secured to the cursor support member for rotation about an axis normal to the ploting surface when the cursor is adjacent to the plotting surface.

* * * * *